United States Patent [19]

Targa Pascual

[11] Patent Number: 4,688,383

[45] Date of Patent: Aug. 25, 1987

[54] SUPERCHARGER SYSTEM FOR USE WITH HEAT ENGINES

[76] Inventor: Juan Targa Pascual, Benet Mercade, 17, Barcelona, Spain

[21] Appl. No.: 736,797

[22] Filed: May 22, 1985

[30] Foreign Application Priority Data

Jun. 4, 1984 [ES]  Spain ................................. 533434
Jun. 4, 1984 [ES]  Spain ................................. 533435

[51] Int. Cl.⁴ ............................................. F02B 37/00
[52] U.S. Cl. ...................................... 60/599; 123/563; 165/151; 165/160
[58] Field of Search .......................... 60/599; 123/563; 165/151, 160, 141

[56] References Cited

U.S. PATENT DOCUMENTS

| | | | |
|---|---|---|---|
| 1,798,330 | 3/1931 | Leek | 165/141 |
| 2,292,233 | 8/1942 | Lysholm | 123/559 |
| 2,332,336 | 10/1943 | Norris | 165/141 |
| 2,748,562 | 6/1956 | Kauffmann | 60/599 |
| 2,803,440 | 8/1957 | Simpelaar | 165/160 |

FOREIGN PATENT DOCUMENTS 46016  3/1982  Japan ................................. 60/599

*Primary Examiner*—Douglas Hart
*Attorney, Agent, or Firm*—Brumbaugh, Graves, Donohue & Raymond

[57] ABSTRACT

An engine supercharger system has a heat exchanger cooling the supercharger air flow in response to supercharger pressure.

3 Claims, 9 Drawing Figures

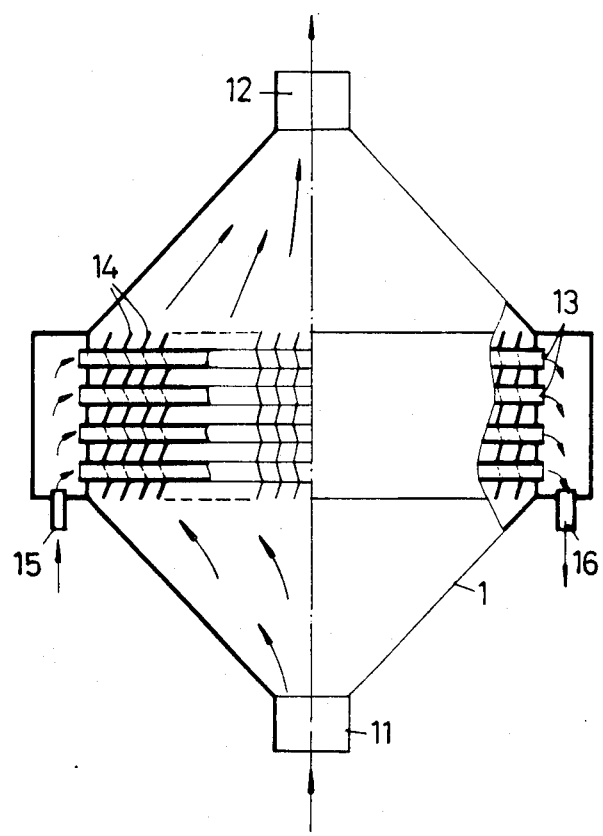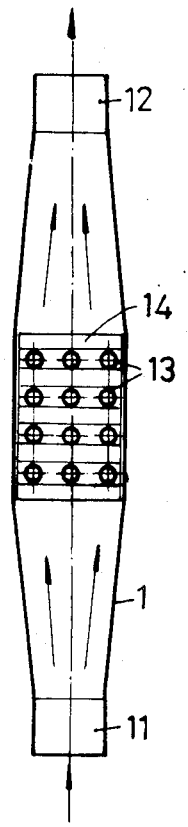

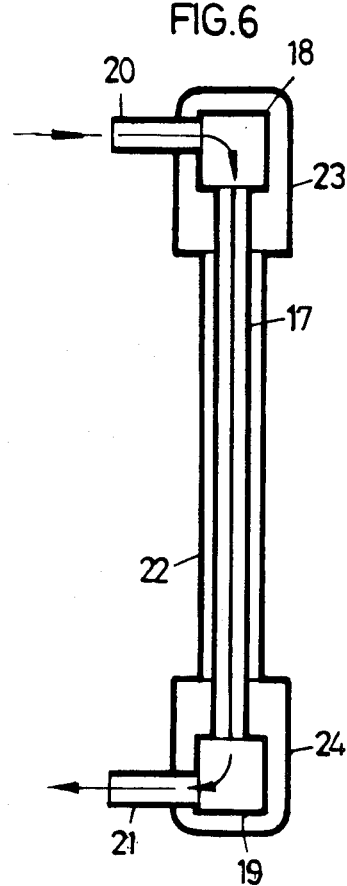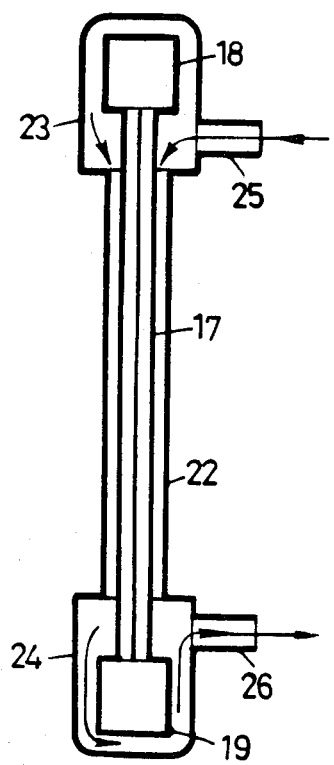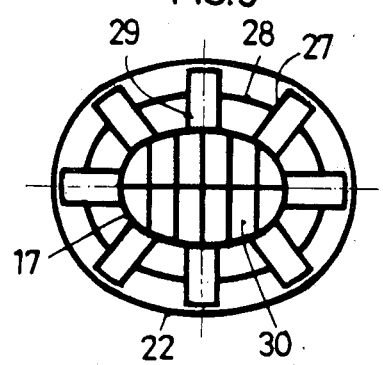

SUPERCHARGER SYSTEM FOR USE WITH HEAT ENGINES

This patent refers to a supercharger system for use with heat engines by means of which a considerable increase in power is obtained for a given engine, essentially under the control of the operator.

As is already known, the supercharging of engines consists of increasing the inlet pressure to the cylinders so as to obtain an improved charge to the cylinder and hence a higher effective pressure, resulting in an increase of power for the same speed, and this, by raising the inlet manifold pressure by means of a compressor. The compressors generally used may be turbocompressors in which the rotary compressor is driven by a turbine using the engine exhaust gases, or alternatively, a volumetric system in which the action of compressing the air or the fuel mixture is produced by means of a pumping or impulsion operation of the air or mixture into the inlet manifold.

In any event the compressing of the air or the mixture raises the temperature of the gas and results in a lessening of the weight of the gaseous fluid entering the engine. The object of this patent is a system designed to obviate this detriment, thus allowing a notable increase in the quantity of air or mixture admitted to the engine and hence an increase of similar proportions in the developed output power of the engine.

Essentially the system which is the object of this patent involves the combining of a heat exchanger of an air/liquid type, a refrigerant circulating pump, a radiator for the transfer of heat between the air and the refrigerant liquid, together with other ancilliary components including an expansion chamber. The admission gas/liquid heat exchanger provides a reduction in the temperature of the compressed air or gases by passing the gas which has to be cooled between a multiplicity of finned tubes through which the refrigerant is circulating, the refrigerant being pumped under the control of the compressor pressure, such that its start-up or shutdown is governed by values determined by the inlet pressure of the engine, preferably by means of a time delay which causes a time-phase interval between the control pressure and the precise instant of actuation of the pump. The system is completed with the addition of an air/liquid radiator for the dissipation into the atmosphere of the heat in the refrigerant coming from the first heat exchanger.

The cooling effect at this air/liquid radiator is produced by means of an electric fan, similarly controlled.

The heat transfer between the inlet gases and the refrigerant is obtained by means of a series of concentric tubes, the refrigerant flowing through one set of tubes and the air through tubes enveloping the former, there being separate manifolds at the inlet and outlet for each of the two fluids.

To provide a better understanding of the specification, the attached drawings illustrate one embodiment of the invention.

FIGS. 3 and 4 are cross-sections of the heat exchanger between the gaseous phase and the liquid phase.

FIG. 6 is a cross-section on the plane VI—VI of FIG. 5.

FIG. 7 is a side elevation corresponding to the previous figures.

FIG. 9 is a detail in cross-section on the plane IX—IX of FIG. 5.

Figure 1:
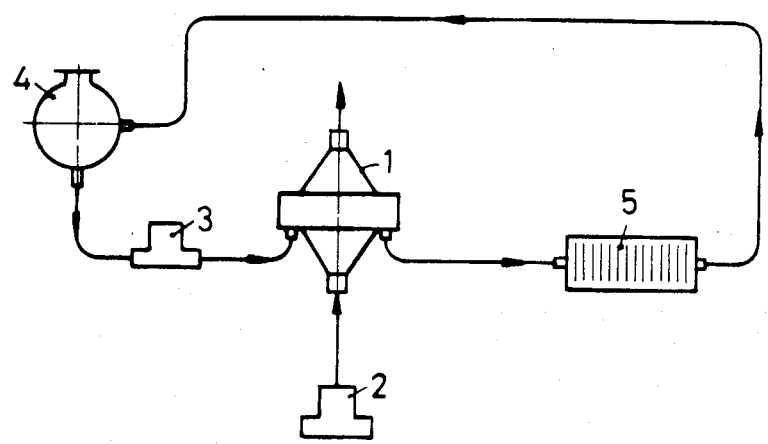
FIGS. 1 and 2 are typical diagrams of the components relevant to this invention.

As may be seen in FIG. 1, the system which is the object of this patent comprises fundamentally a heat exchanger -1-, between the gaseous fluid being supplied to the engine and water, the gas arriving from a turbocompressor or volumetric compressor -2-, the water being the coolant in a refrigerant circuit which includes a pump -3-, an expansion chamber -4- and an air/water radiator -5-.

The water pump -3- is controlled by a pressure sensitive sensor under the influence of the compressor pressure with a time-delay effect causing a small time dephasing between the operation of the said pump and the instant of attaining the control pressure. This interval may be of the order of some 30 seconds.

The radiator -5- is cooled by means of an electric fan which can equally be suitably controlled from an automatic or an external manual actuator.

Figure 2:
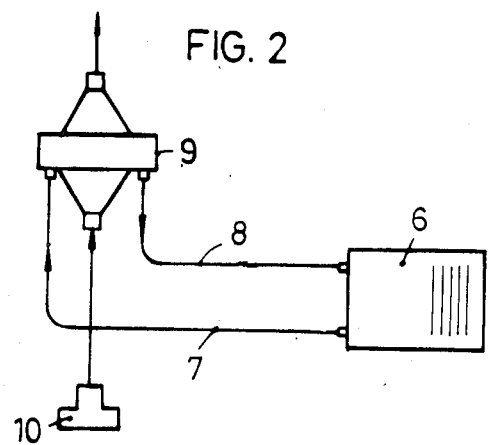
Figure 5:
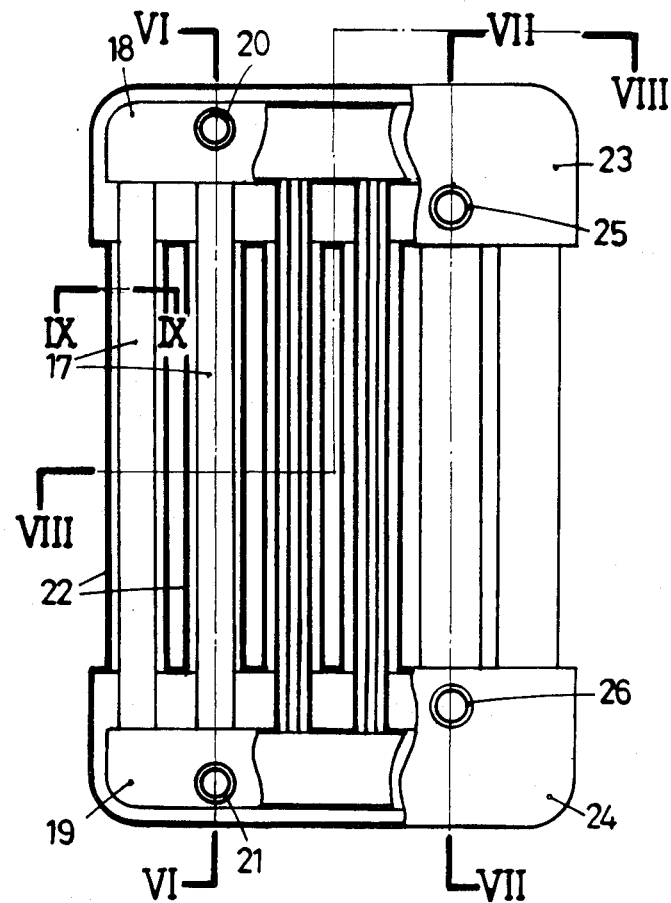
FIG. 5 shows an elevation with a partial cut-away section of a gas cooler as incorporated in these improvements.
Figure 8:
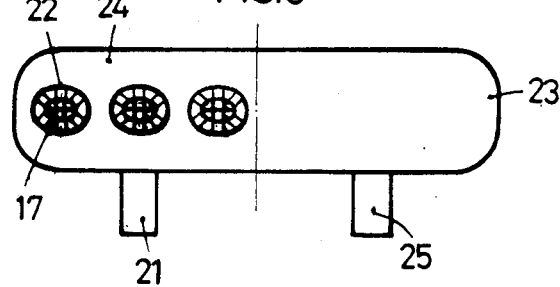
FIG. 8 is a cross-section on the plane VIII—VIII of FIG. 5.

As may be seen in FIG. 2, the gas to liquid heat transfer may be provided by incorporating the gas/liquid heat exchanger in a cooling circuit with a refrigerator -6- connected by tubing -7- and -8- to the heat exchanger -9-, which in turn is fed by the turbo or volumetric compressor -10- as shown in the diagram.

In accordance with this invention, as may be seen in FIGS. 3 and 4, the heat exchanger -1- consists of a casing provided with an inlet port -11- and an outlet port -12- for the gaseous fluid, be it a fuel mixture or simply air in its passage to the engine cylinders, and complementing this, a series on internal tubes forming a bundle -13-, with fins -14-, through which passes a coolant liquid coming from a circuit which includes entry and exit ports -15- and -16-.

One characteristic of this heat exchanger is the ample divergence or angle formed between the casing connecting the inlet and outlet ports -11- and -12- and the space occupied by the tubes -13-, with a resulting reduction in losses to the charge.

As illustrated in FIGS. 5-9, the present improvements also refer to the structure of the transfer of heat between the fluid charge to the motor and the cooling circuit water by means of an arrangement of internal tube bundles -17- which are mutually parallel and which connect to an upper chamber -18- and a lower chamber -19- and in which are provided respectively entry ports -20- and outlet ports -21- for the refrigerant fluid which normally would be water, these same tubes and chambers being enveloped by another series of tubes in bundles -22- which encase externally the tubes -17- and other upper and lower chambers -23- and -24- which encase the chambers -18- and -19-. Entry and exit ports -25- and -26- complete the engine charge gas circuit, the gases circulating on the outside of the space occupied by the internal coolant fluid, this in the case mentioned above, being water.

This arrangement allows for the passage of a second refrigerant fluid, preferably air, which flows on the outside of the tubes -22- and the chambers -23- and -24-, producing the double cooling effect, an object of these present improvements.

For preference the flow of the internal and the external refrigerant fluids should be co-axial, as may be seen, with the external fluid flow, air, being transversal.

To improve the calorific interchange and to save space occupied by the tubes this improvement in design envisages the tubes as being generally in an oval form as may be seen in the transverse section with a castellated bent structure of the inner tubes as seen in FIG. 9, the folds being virtually right angled determining protrusions -27- which are radial between the inner surface -28- of the inner tube and the surface of the enveloping external tube -17-.

Also to allow a better heat transfer in the inner tube this is provided with a multiplicity of interior radial fins -29- which extend to within the tube providing an ideally radial space -30- within the nucleous thereof.

All matters not altering, modifying or affecting the essence of the above described system will be variable insofar as this patent is concerned.

What is claimed is:

1. A supercharger system for use with a heat engine, comprising: a first heat exchanger having a gaseous phase and a refrigerant liquid phase, said gaseous phase being provided so as to supply the engine from a supercharger compressor, and said refrigerant liquid phase being provided so as to cool said gaseous phase and eliminate excessive heat generated by the supercharger compressor; an independent refrigerant liquid pump for providing liquid flow, means controlling said pump as a function of supercharger pressure and having a time delay for providing a functional dephasing; a second heat exchanger for heat exchange between said refrigerant liquid phase of said first heat exchanger and surrounding air; and an expansion chamber for said refrigerant liquid phase.

2. A supercharger system as defined in claim 1, wherein said first heat exchanger includes a casing provided so as to envelop a cross flow of supercharged gases and the refrigerant liquid, and a system of finned tubes provided in said casing for carrying the refrigerant liquid, said finned tubes being interposed in the stream of supercharged gases.

3. A supercharger system as defined in claim 2, wherein said casing has an entry port and an exit port for the supercharged gases, and is formed with spacious manifolds connected to each of said ports, said manifolds and ports being connected so as to form angles of at least 90 between said ports and corresponding manifold portions to which they are connected.

* * * * *